United States Patent
Pakhchyan et al.

(10) Patent No.: US 8,416,224 B2
(45) Date of Patent: *Apr. 9, 2013

(54) METHOD OF OPERATING AN ARRAY OF ELECTROMECHANICAL PIXELS RESULTING IN EFFICIENT AND RELIABLE OPERATION OF LIGHT MODULATING ELEMENTS

(75) Inventors: Edward Pakhchyan, Glendale, CA (US); Haik Mesropian, Glendale, CA (US); Syuzi Pakhchyan, Glendale, CA (US)

(73) Assignee: Edward Pakhchyan, Glendale, CA (US)

( * ) Notice: Subject to any disclaimer, the term of this patent is extended or adjusted under 35 U.S.C. 154(b) by 824 days.

This patent is subject to a terminal disclaimer.

(21) Appl. No.: 12/462,248

(22) Filed: Jul. 31, 2009

(65) Prior Publication Data

US 2011/0025657 A1 Feb. 3, 2011

(51) Int. Cl.
*G09G 3/34* (2006.01)
*G09G 5/00* (2006.01)
*G06F 3/038* (2006.01)
*G02B 26/08* (2006.01)
*G02B 26/10* (2006.01)
*G02B 26/12* (2006.01)
*G02B 26/02* (2006.01)
*G02B 26/00* (2006.01)

(52) U.S. Cl.
USPC ............. 345/205; 345/84; 345/85; 345/108; 345/109; 359/212.1; 359/212.2; 359/213.1; 359/214.1; 359/230; 359/290; 359/291; 359/292; 359/295

(58) Field of Classification Search .................. 345/205
See application file for complete search history.

(56) References Cited

U.S. PATENT DOCUMENTS

| | | | |
|---|---|---|---|
| 5,280,277 A | 1/1994 | Hornbeck | |
| 5,382,961 A | 1/1995 | Gale, Jr. | |
| 5,444,566 A | 8/1995 | Gale et al. | |
| 5,771,116 A | 6/1998 | Miller et al. | |
| 5,912,758 A | 6/1999 | Knipe et al. | |
| 6,144,481 A * | 11/2000 | Kowarz et al. | 359/291 |
| 6,438,282 B1 * | 8/2002 | Takeda et al. | 385/16 |
| 6,891,657 B2 | 5/2005 | Hewlett et al. | |
| 7,423,798 B2 | 9/2008 | Pan | |
| 8,305,342 B2 * | 11/2012 | Pakhchyan et al. | 345/108 |
| 2005/0088721 A1 * | 4/2005 | Richards et al. | 359/291 |
| 2007/0170151 A1 * | 7/2007 | Kimura et al. | 218/132 |

* cited by examiner

*Primary Examiner* — Alexander S Beck
*Assistant Examiner* — Karin Kiyabu

(57) ABSTRACT

Operating methods of an array of electromechanical pixels resulting in efficient and reliable operation of light modulating elements. The invention simplifies the design of electromechanical light modulators and permits the construction of large size displays with greater mechanical tolerances on glass substrates.

21 Claims, 4 Drawing Sheets

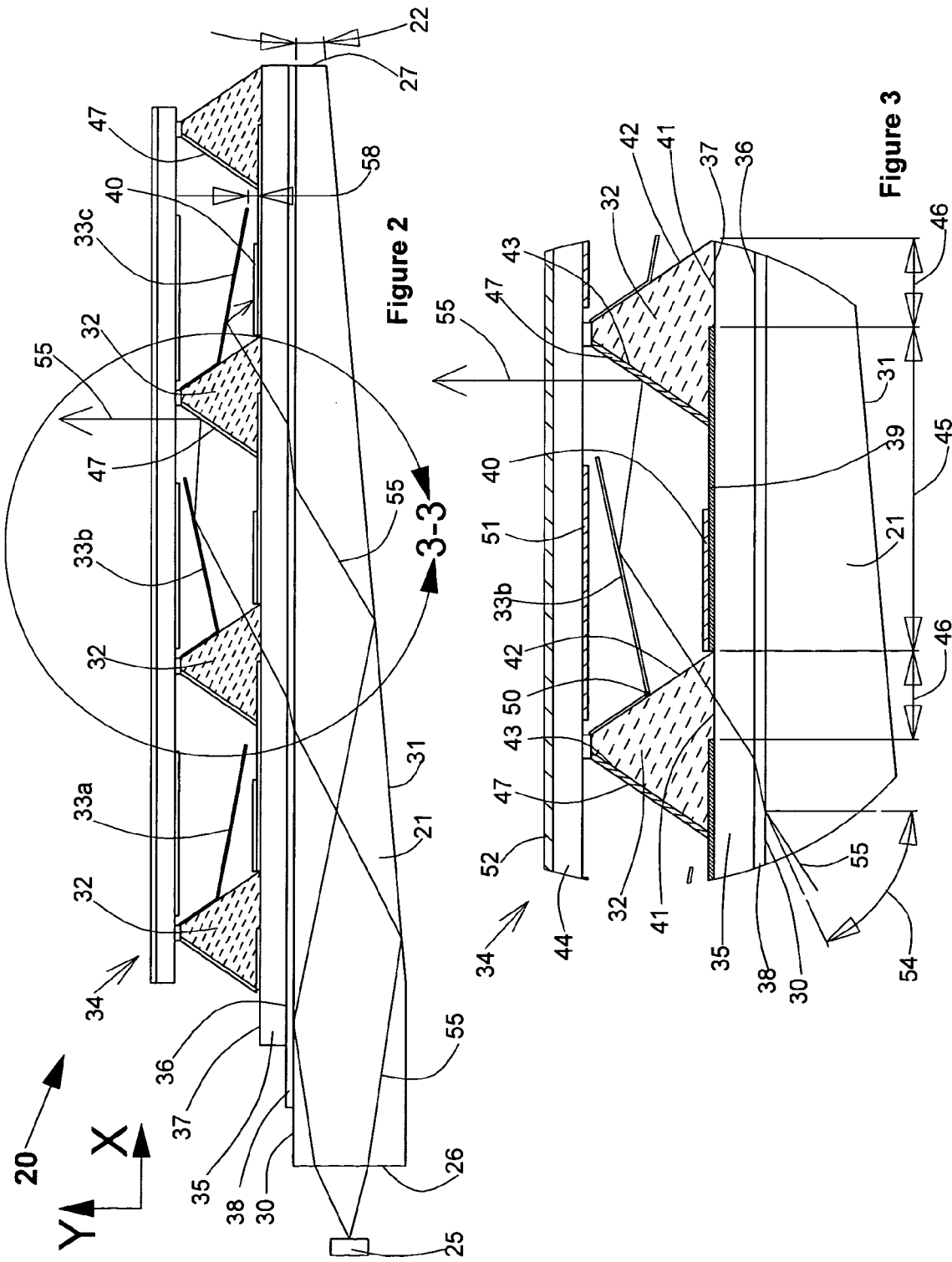

METHOD OF OPERATING AN ARRAY OF ELECTROMECHANICAL PIXELS RESULTING IN EFFICIENT AND RELIABLE OPERATION OF LIGHT MODULATING ELEMENTS

RELATED U.S. PATENT DOCUMENTS

U.S. Ser. No. 12/079,527 Mar. 27, 2008 "PLASMA ADDRESSED MICRO-MIRROR DISPLAY" which is included here as reference.

TECHNICAL FIELD OF THE INVENTION

The present invention relates generally to displays. More particularly the invention concerns displays comprising electromechanical picture elements actuated by electrostatic force for modulating light to display motion images. More specifically the invention is directed to the operating methods of an array of electromechanical picture elements.

BACKGROUND OF THE INVENTION

Operating methods of electromechanical pixels are known from spatial light modulators (SLM) for projection displays. Prior art SLMs for projection displays comprise an array of micro-mirrors constructed on a semiconductor backplane. In prior art SLMs, each electromechanical pixel comprises a micro-mirror that is mounted on a pair of hinges above a semiconductor substrate, and a pair of address electrodes with associated drive electronics constructed on the semiconductor substrate.

In operation the SLM is scanned and address voltages are supplied to the address electrodes by the drive electronics. To modulate light, micro-mirrors are selectively reset to first or second deflected positions based on address voltages.

Large area flat panel displays based on electromechanical pixels have been proposed by present inventors and others. The prior art operating methods of SLMs require electromechanical pixels with complex mechanical structures and tight mechanical tolerances. Current manufacturing technology for large area flat panel displays that use glass substrates cannot meet these requirements.

Also, prior art operating methods extensively use mechanical force of micro-mirror hinges which changes with operating time and temperature.

The use of mechanical force, especially for selective positioning of micro-mirrors, causes problems such as resetting micro-mirrors to a wrong position. It also requires selection of operating voltages during the display production, and construction of very uniform hinges.

Flat panel displays usually have larger electromechanical pixels than SLMs for projection displays and need greater electrostatic actuation voltages to operate. In order to display motion images and meet the required addressing speeds, the flat panel displays need greater ratio between the actuation voltages and the address voltages than the prior art operating methods can provide.

SUMMARY OF THE INVENTION

The present invention provides efficient and reliable operating methods for an array of electromechanical light modulators. These operating methods are greatly tolerant to initial mechanical variations and changes in mechanical properties from temperature and operating time of electromechanical pixels.

The invention permits simpler design of electromechanical light modulators and construction of large size displays on glass substrates. Each electromechanical pixel may be addressed with one electronic switch such as a transistor or a circuit employing low-pressure gas discharge.

The invention also solves problems associated with electromechanical pixels such as stiction and vibration of movable elements. Additionally the invention provides operating methods which effectively dissipate residue electrostatic charges that may accumulate on surfaces of insulators and cause malfunction of pixels.

The foregoing as well as other advantages of the invention will be apparent by the novel operating methods illustrated in the accompanying drawings and described in the specification that follows.

BRIEF DESCRIPTION OF THE DRAWINGS

FIG. 2 is a cross-sectional view taken along lines 2-2 of FIG. 1.

FIG. 3 is an enlarged view of the area designated as 3-3 in FIG. 2.

DETAILED DESCRIPTION OF THE INVENTION

Figure 1:
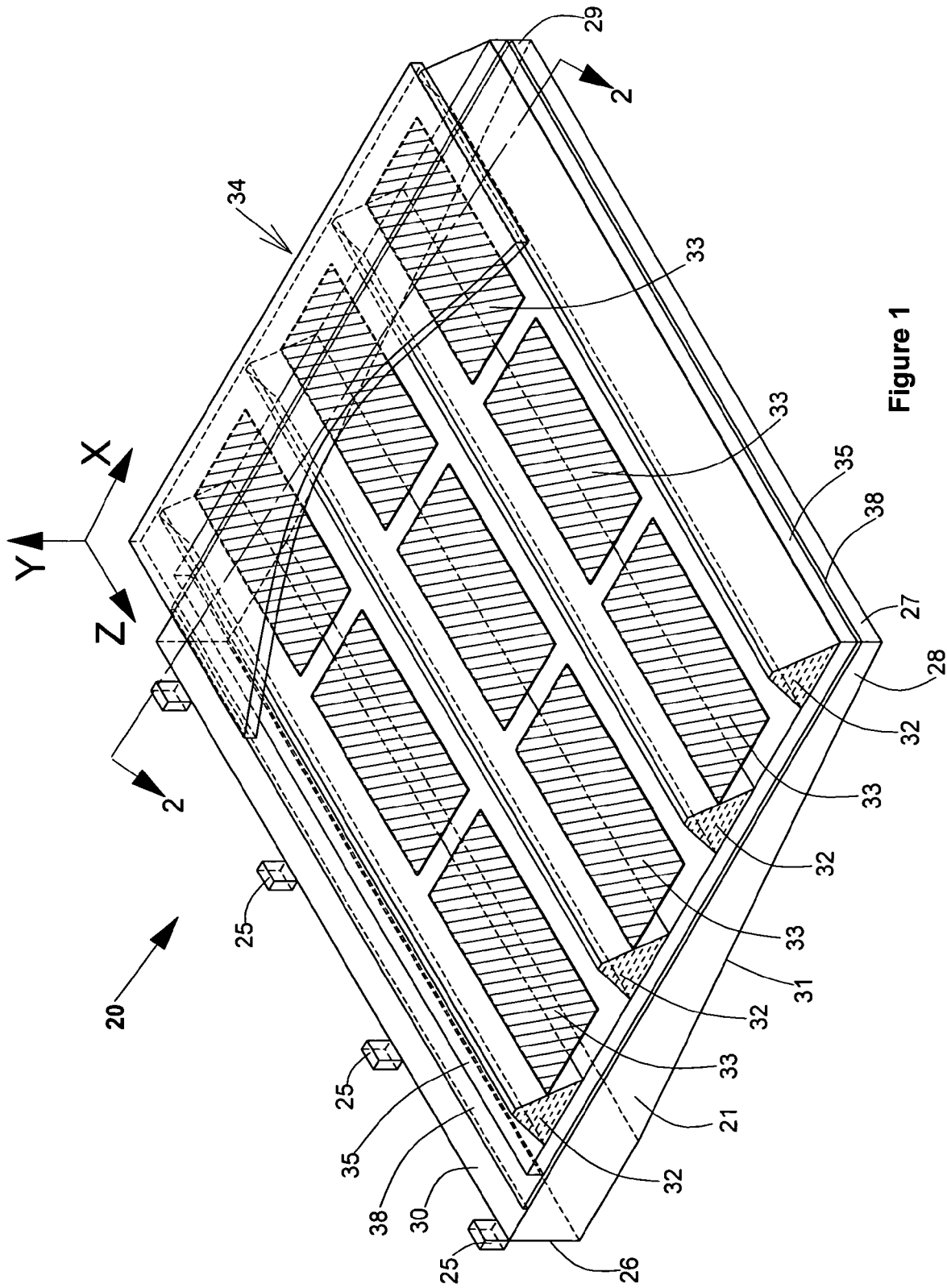
FIG. 1 is a perspective view of the display of the present invention.

FIGS. 1 through 3 of the drawings illustrate the construction and optical functionality of a display panel 20. Referring to FIGS. 1 and 2 the display 20 includes a rectangular optical waveguide 21 that is substantially wedge-shaped cross section. Waveguide 21 is preferably constructed from acrylic or other optically transparent material, having a refractive index n1 with a value between 1.49 and 1.6 and comprises parallel first and second end surfaces 26 and 27 that are joined by parallel side surfaces 28 and 29 (see FIG. 1). Waveguide 21 also includes an upper surface 30 and a lower surface 31 converging with upper surface 30. Display 20 also includes a substrate 35 constructed from a substantially transparent material such as glass having a refractive index n2 with a value between 1.49 and 1.6. Lower surface 36 of substrate 35 is optically coupled to the upper surface 30 of waveguide 21 via an optical layer 38 formed from a fluoropolymer or other substantially transparent material having a refractive index n3 with a value between 1.3 and 1.4.

A plurality of equally spaced-apart micro-prisms 32 are constructed at upper surface 37 of substrate 35 and, as shown in FIG. 1, extend between side surfaces 28 and 29 of waveguide 21. Micro-prisms 32 may be molded or constructed using lithography from a UV curing polymer having a refractive index n4 with a value between 1.49 and 1.6. LED light sources 25 are installed proximate the wide edge 26 of waveguide 21 and a plurality of tilting micro-mirrors 33 are constructed between micro-prisms 32. In FIG. 2, one column of tilting micro-mirrors is designated as 33a, 33b, and 33c. A section of a cover assembly 34 is illustrated in FIG. 1 and detailed construction is shown in FIG. 3.

Now referring to FIG. 3 of the drawings where details of multi-layer optical coatings are shown. The first layer is a light-reflecting layer 39 constructed from metal on upper surface 37 of substrate 35. The light-reflecting layer 39 is patterned to form plurality of light reflecting regions 45 and light transmitting regions 46. The second optical layer is a light-absorbing layer 40 formed on light-reflecting layer 39 and is patterned to partially cover light reflecting layer 39.

Further illustrated in FIG. 3 are micro-prisms 32. Each micro-prism 32 comprises a light input facet 41, which is optically coupled to the upper surface 37 of substrate 35, and a light exit facet 42, which is inclined with respect to the upper surface 30 of waveguide 21. A reflective mirror film is deposited on the third facet 43 of micro-prisms 32 to form a light-deflecting facet 47 which is also inclined with respect to the upper surface 30 of waveguide 21 and in opposite direction to light exit facet 42 of micro-prisms 32.

FIG. 3 also illustrates one of tilting micro-mirrors 33b, which typifies the construction of each of the micro-mirrors of display panel 20. Micro-mirror 33b comprises a thin aluminum alloy elastic film that is affixed to the upper portion of the light exit facet 42 of micro-prism 32. Micro-mirror 33 is attached to micro-prisms 32 with a pair of hinges and it tilts at about axis 50 that is substantially parallel to upper surface 30 of the waveguide 21.

To prevent micro-mirror stiction a small gap 58 (FIG. 2) is required between the edge of micro-mirrors and the landing surfaces. Constructing small spacers from polytetrafluoroethylene or extending small portions of micro-mirrors along the edge so the entire edge of the micro-mirrors does not touch the landing surfaces may realize this.

Further illustrated in FIG. 3 is cover assembly 34, which is affixed to the upper facets of micro-prisms 32. Cover assembly 34 comprises a substrate 44 made of glass or other substantially transparent material. A light-absorbing layer 51 constructed on the lower surface of substrate 44 from a conductive light absorbing film or a multilayer film that includes a conductor layer. The light-absorbing layer 51 is patterned and located directly above micro-mirrors 33. The cover assembly 34 further includes a light shaping elliptical diffuser 52 formed on the upper surface of substrate 44.

In display panel 20 tilting micro-mirrors 33 actuate by electrostatic attraction force. When a suitable voltage is applied between conductive light reflecting layer 39 and a micro-mirror 33, the micro-mirror tilts down by electrostatic attraction force. When a suitable voltage is applied between conductive light absorbing layer 51 and a micro-mirror 33, the micro-mirror tilts up by electrostatic attraction force.

As best seen in FIG. 2 of the drawings, light rays 55 entering from the wide edge 26 of waveguide 21 reflect from upper surface 30 and lower surface 31 by total internal reflections and change angles towards normal with respect to the upper surface 30. Light rays 55 exit waveguide 21 from upper surface 30 when the incident angle is less than the critical angle 54 defined by refractive index n1 of waveguide 21 and refractive index n3 of light transmitting layer 38. Light rays passing through substrate 35 enter micro-prisms 32 from light input facet 41. Light rays exit micro-prisms 32 from light exit facets 42.

Depending on positions of tilting micro-mirrors 33, light rays are absorbed, or directed to the viewer. When a micro-mirror is tilted up, such as micro mirror 33b (FIG. 2), light rays reflect from the lower surface of micro-mirrors and are directed to the viewer by reflecting from light reflecting facets 47. When a micro-mirror is tilted down, such as micro-mirror 33c, light rays reflect from the lower surface of micro-mirrors 33 and are absorbed in light-absorbing layer 40.

Figure 4:
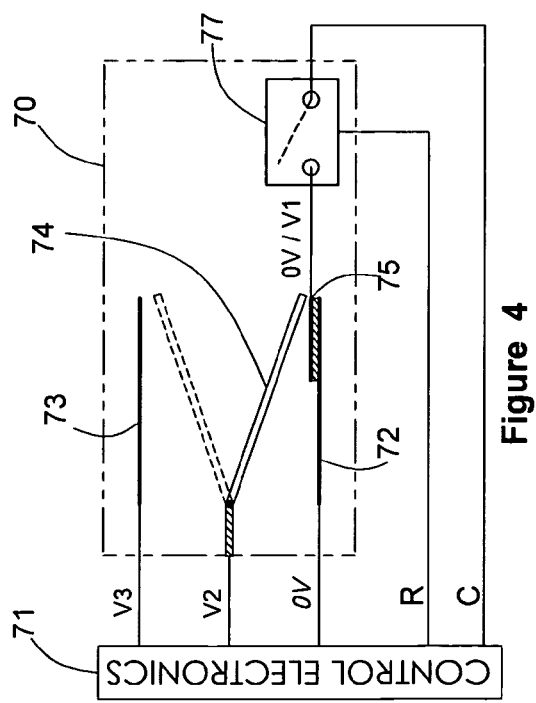
FIG. 4 is a schematic diagram of one pixel of an array of electromechanical pixels.

FIG. 4 illustrates a schematic diagram of one pixel 70 of an array of electromechanical pixels. Pixel 70 comprises a lower electrode 72, an upper electrode 73, a tilting micro-mirror 74 and a pixel-addressing electrode 75. Pixel 70 also includes an electronic switch 77, which provides selective address voltages 0V or V1 to the pixel-addressing electrode 75. The pixel-addressing electrode 75 forms a capacitor with lower electrode 72 to store electrical charges supplied by electronic switch 77. Electronic switch 77 may be a transistor or an electronic circuit employing low-pressure gas discharge that is described in U.S. Ser. No. 12/079,527 patent application. The circuit described in U.S. Ser. No. 12/079,527 patent application initiates an arc in a low-pressure discharge gas to supply voltage potential to pixel-addressing electrodes.

FIG. 4 also illustrates a control electronics 71, which provides micro-mirror actuation voltages to the electrodes of pixel 70. Control electronics 71 also provides scanning voltages to row electrodes R and synchronized data to column electrodes C to address the array of electromechanical pixels.

Micro-mirrors and hinges may be manufactured on a planar surface that is parallel to a surface of a glass substrate. After constructing micro-mirrors, the mechanical rest or neutral position may be changed from the flat position to a tilted down position. To realize this, a suitable voltage may be applied between micro-mirrors 74 and lower electrodes 72 to tilt micro-mirrors and, while holding micro-mirrors at tilted down position, heat may be applied at sufficiently high temperatures to micro-mirror hinges.

In FIG. 4 the mechanical rest position of micro-mirrors 74 is at tilted down position and near to pixel-addressing electrodes 75. In operation this helps to reduce the required address voltage V1 supplied to pixel-addressing electrodes 75 and allows greater variations in the mechanical specifications of micro-mirror hinges.

Figure 5:
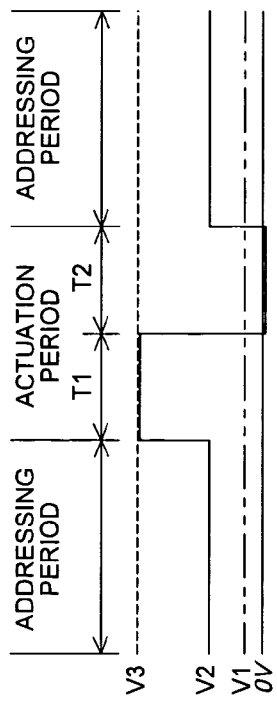
FIGS. 5 to 10 illustrate voltage waveforms of the invention supplied to the array of electromechanical pixels.

FIG. 5 illustrates first voltage waveforms of the invention supplied to the array of electromechanical pixels 70 by control electronics 71. Initially 0V is applied to lower electrodes 72, a DC voltage V3 is applied to upper electrodes 73 and a DC voltage V2, with a value between 0V and V3, is applied to micro-mirrors 74. These applied voltages generate an electrostatic bias force between each micro-mirror and the nearest upper or lower electrodes and retain micro-mirrors 74 at selected upper and lower positions during the addressing period. Also during the addressing period, a new set of address voltages 0V or V1 is supplied to pixel-addressing electrodes 75.

During the actuation period and time interval T1, voltage V2 supplied to micro-mirrors 74 is raised to value V3 of the upper electrodes 73. This increases electrostatic attraction force between micro-mirrors and lower electrodes 72 therefore micro-mirrors that are located at upper position tilt down to lower position. Now all micro-mirrors are settled at lower position and closer to pixel-addressing electrodes 75.

During the time interval T2, voltage V2 supplied to micro-mirrors is reduced to 0V. This generates a selective electrostatic force between micro-mirrors and addressing electrodes 75. Electrostatic force between the micro-mirrors and respective pixel-addressing electrodes 75 with voltage potential V1 is greater than the electrostatic force between the micro-mirrors and upper electrodes 73. Therefore these micro-mirrors are held at lower position and micro-mirrors with addressing electrodes 75 having voltage potential 0V tilt to the upper position.

During the following addressing period the voltage potential applied to micro-mirrors 74 is raised to initial value V2 to retain micro-mirrors at new selected positions.

Figure 6:
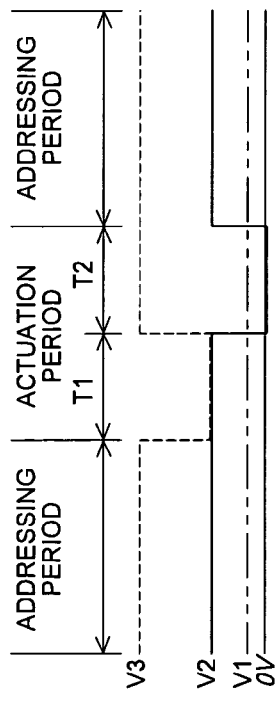

FIG. 6 illustrates second voltage waveforms of the invention supplied to the array of electromechanical pixels 70 by control electronics 71. The operating method is the same as described with regards to FIG. 5 except for time interval T1 during the actuation period.

During the time interval T1 voltage V3 applied to upper electrodes 73 is reduced to value V2 of micro-mirrors 74. This reduces electrostatic bias force between micro-mirrors 74 located at upper position and upper electrodes 73 and allows micro-mirrors to tilt down. Micro-mirrors tilt down by a combination of electrostatic force between micro-mirrors and lower electrodes generated by V2 voltage supplied to the micro-mirrors and mechanical forces stored in hinges.

This second operating method permits closer distance between the micro-mirrors and the pixel addressing electrodes by limiting maximum voltage difference to V2 between the micro-mirrors and the pixel addressing electrodes.

Figure 7:
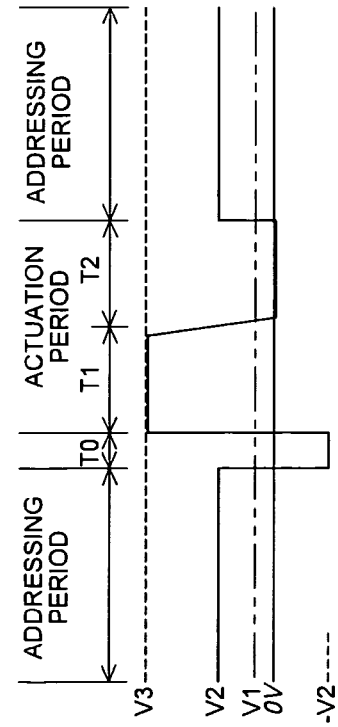

FIG. 7 illustrates third voltage waveforms of the invention supplied to the array of electromechanical pixels 70 by control electronics 71. The operating method is the same as described with regards to FIG. 5 except for the time interval T0.

During time interval T0, voltage V2 supplied to micro-mirrors 74 is reduced to −V2. This increases the electrostatic force between upper electrodes 73 and micro-mirrors 74 located at upper position. If micro-mirrors 74 are designed sufficiently flexible, the increased electrostatic force will cause micro-mirrors to bend or bow towards the upper electrodes 73 and release micro-mirrors stuck at the upper position.

As before, during the actuation period and time interval T1, voltage V2 supplied to micro-mirrors 74 is raised to value V3 of upper electrodes 73. This increases electrostatic attraction force between micro-mirrors and lower electrodes 72 therefore micro-mirrors located at upper position tilt down to the lower position.

Additionally this increased electrostatic attraction force between micro-mirrors and lower electrodes 72 bows flexible micro-mirrors towards lower electrodes 72 and releases stuck micro-mirrors.

Now that all micro-mirrors are at lower position, voltage V2 supplied to micro-mirrors 74 is gradually reduced from V3 to 0V. This helps dissipate mechanical forces stored in flexible micro-mirrors during T1, so selective displacement of micro-mirrors during T2 will operate mainly by electrostatic forces.

The above operating method helps to release micro-mirrors that are stuck due to humidity or capillary forces between micro-mirrors and landing surfaces. The described method may be used in addition to using fluorosurfactant as a lubricant in the electromechanical pixels.

Figure 8:
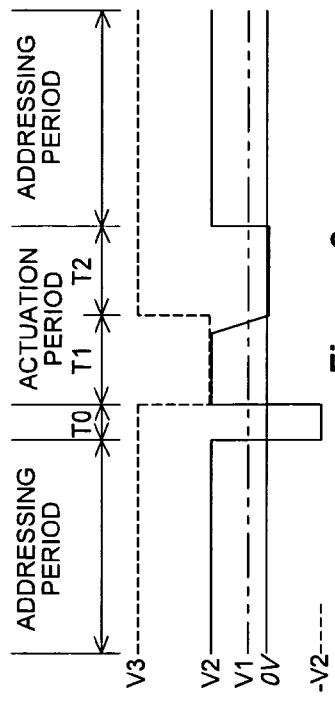

FIG. 8 illustrates fourth voltage waveforms of the invention supplied to the array of electromechanical pixels 70 by control electronics 71. The operating method is the same as described with regards to FIG. 6 during time intervals T1 and T2 and similar as described with regards to FIG. 7 during time interval T0 and during transition from T1 to T2.

Figure 9:
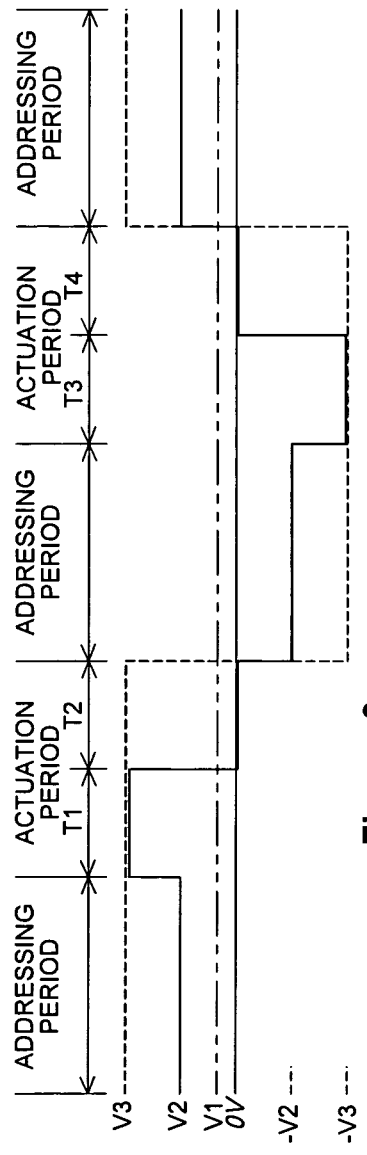

FIG. 9 illustrates fifth voltage waveforms of the invention supplied to the array of electromechanical pixels 70 by control electronics 71. The operating method is the same as described with regards to FIG. 5. Here supplied voltages V2 to micro-mirrors 74 and supplied voltages V3 to lower electrodes 72 are inverted during subsequent addressing and actuation periods. This helps to dissipate residual electrostatic charges accumulated on insulator surfaces during the operation and prevents pixel malfunction.

Figure 10:
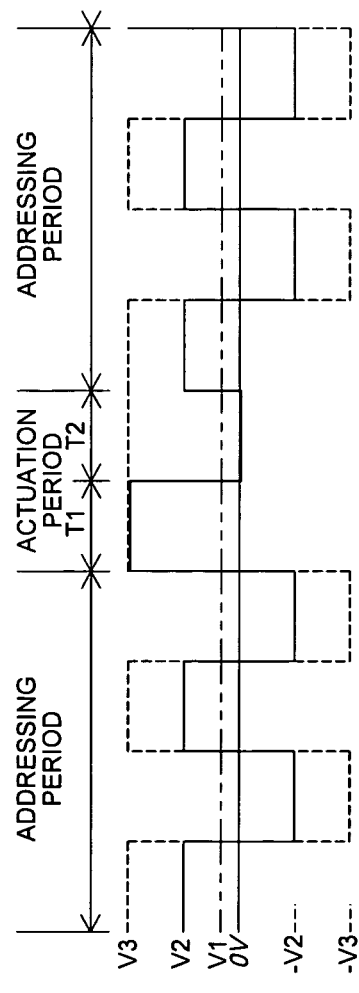

FIG. 10 illustrates sixth voltage waveforms of the invention supplied to the array of electromechanical pixels 70 by control electronics 71. The operating method is the same as described with regards to FIG. 5. Here during the addressing periods alternating voltage V2 is supplied to micro-mirrors 74 and V3 to lower electrodes 72 in order to dissipate residual electrostatic charges accumulated on insulator surfaces.

Both of these methods described for dissipating residual electrostatic charges can be combined with methods described for releasing stuck micro-mirrors with regards to FIGS. 7 and 8.

Depending on the display size and resolution, each picture element of the display panel may include several tilting micro-mirrors. Reducing the size of individual micro-mirrors helps to reduce the required electrostatic actuation voltages.

Also, micro-mirrors for each picture element may be grouped to modulate different levels of light when suitable voltage is applied between the fixed electrodes and a selected group of micro-mirrors. This reduces the display addressing constraints. For example, each picture element may include 7 micro-mirrors grouped in quantities of 1, 2 and 4 and selectively addressed to modulate 8 levels of light. Additionally, temporal artifacts inherent in pulse-width-modulation displays are reduced.

Having now described the invention in detail in accordance with the requirements of the patent statutes, those skilled in this art will have no difficulty in making changes and modifications in the individual parts or their relative assembly in order to meet specific requirements or conditions. Such changes and modification may be made without departing from the scope and spirit of the invention, as set forth in the following claims.

We claim:

1. A method of operating light modulating elements of electromechanical pixels wherein each said light modulating element takes a selective first or second position according to a set of selective address voltages, said method comprising the steps of:
   a) retaining said light modulating elements at said first and second positions by applying an electrostatic bias force to each said light modulating element;
   b) applying a new set of selective address voltages to said electromechanical pixels;
   c) displacing said light modulating elements from said first position to said second position by applying an electrostatic force to said light modulating elements;
   d) selectively displacing said light modulating elements from said second position to said first position by applying selective electrostatic force to each said light modulating element, and
   e) retaining said light modulating elements at the selected positions in step d) by reapplying said electrostatic bias force to each said light modulating element.

2. A method of operating light modulating elements of electromechanical pixels wherein each said light modulating element takes a selective first or second position according to a set of selective address voltages, said method comprising the steps of:
   a) retaining said light modulating elements at said first and second positions by applying an electrostatic bias force to each said light modulating element;
   b) applying a new set of selective address voltages to said electromechanical pixels;
   c) allowing said light modulating elements to move from said first position to said second position by substantially reducing said electrostatic bias force from said light modulating elements located at said first position;
   d) selectively displacing said light modulating elements from said second position to said first position by applying selective electrostatic force to each said light modulating element, and
   e) retaining said light modulating elements at the selected positions in step d) by reapplying said electrostatic bias force to each said light modulating element.

3. The method of claim 1 further including a step of gradually reducing said electrostatic force from said light modulating elements during the transition from said step c) to said step d).

4. The method of claim 2 further including a step of gradually reducing said electrostatic bias force from said light modulating elements during the transition from said step c) to said step d).

5. The method of claim 1 further including a step of increasing said electrostatic bias force applied to said light modulating elements located at said first position following said step b) and before said step c).

6. The method of claim 1 further including a step of increasing said electrostatic bias force applied to said light modulating elements located at said first position following said step b) and before said step c) and gradually reducing said electrostatic force from said light modulating elements during the transition from said step c) to said step d).

7. The method of claim 2 further including a step of increasing said electrostatic bias force applied to said light modulating elements located at said first position following said step b) and before said step c) and gradually reducing said electrostatic bias force from said light modulating elements during the transition from said step c) to said step d).

8. The method of claim 1 wherein said light modulating elements comprise of tilting micro-minors.

9. The method of claim 1 wherein each said electromechanical pixels comprise a plurality of said light modulating elements that are grouped to modulate selective levels of light.

10. The method of claim 2 wherein each said electromechanical pixels comprise a plurality of said light modulating elements that are grouped in power of 2 increments to modulate selective levels of light.

11. The method of claim 1 wherein said step of applying a new set of selective address voltages to said electromechanical pixels includes a step of initiating an arc in a low pressure discharge gas.

12. The method of claim 2 wherein each said light-modulating elements have a mechanically neutral state at said second position.

13. The method of claim 1 wherein said light modulating elements comprise of tilting micro-mirrors and each said tilting micro-mirror tilts in two directions.

14. The method of claim 2 wherein said light modulating elements comprise of tilting micro-mirrors and each said tilting micro-mirror tilts in two directions and has a mechanically neutral state at said second position.

15. The method of claim 1 wherein said electromechanical pixels have an ON state and an OFF state when said light-modulating elements located at said respective first and second positions.

16. The method of claim 1 wherein said step a) is performed by supplying a first polarity voltage to said electromechanical pixels and inverting said first polarity voltage during said step e), thereby dissipating residue electrostatic charges in said electromechanical pixels.

17. The method of claim 2 wherein said retaining steps are performed by supplying alternating voltages to said electromechanical pixels, thereby dissipating residue electrostatic charges in said electromechanical pixels.

18. The method of claim 1 further including a step of gradually reducing said electrostatic force from said light modulating elements during the transition from said step c) to said step d) and wherein said step a) is performed by supplying a first polarity voltage to said electromechanical pixels and inverting said first polarity voltage during said step e).

19. The method of claim 2 further including a step of gradually reducing said electrostatic bias force from said light modulating elements during the transition from said step c) to said step d) and wherein said step a) is performed by supplying a first polarity voltage to said electromechanical pixels and inverting said first polarity voltage during said step e).

20. The method of claim 1 further including a step of gradually reducing said electrostatic force from said light modulating elements during the transition from said step c) to said step d) and said retaining step is performed by supplying alternating voltages to said electromechanical pixels.

21. The method of claim 2 further including a step of gradually reducing said electrostatic bias force from said light modulating elements during the transition from said step c) to said step d) and said retaining step is performed by supplying alternating voltages to said electromechanical pixels.

\* \* \* \* \*